United States Patent [19]
Lyles

[11] 4,228,894
[45] Oct. 21, 1980

[54] COMBINATION FISHING CREEL AND SEAT

[76] Inventor: George C. Lyles, 1075 Hoffman Ave., Long Beach, Calif. 90813

[21] Appl. No.: 17,063

[22] Filed: Mar. 2, 1979

[51] Int. Cl.³ .............................................. B65D 85/50
[52] U.S. Cl. .................................. 206/315 R; 220/20; 190/12 A; 43/56
[58] Field of Search .................... 206/315 R; 220/20; 43/54.5, 54.5 A, 57.5, 57.5 A, 56; 190/12 R, 12 A

[56] References Cited

U.S. PATENT DOCUMENTS

| | | | |
|---|---|---|---|
| 2,264,744 | 12/1941 | Dunnam | 43/54.5 R |
| 2,600,826 | 6/1952 | Allen | 43/56 |
| 3,022,600 | 2/1962 | Glascoff | 43/57.5 R |
| 3,378,134 | 4/1968 | Wilkinson | 220/20 |
| 3,555,719 | 1/1971 | Butler | 43/54.5 R |
| 3,603,019 | 9/1971 | Smeltzer | 43/54.5 R |
| 3,751,845 | 8/1973 | Van Leeuwen | 43/57.5 R |
| 4,005,541 | 2/1977 | Henrichsen | 43/57.5 A |
| 4,128,170 | 12/1978 | Elliott | 206/315 R |

Primary Examiner—Herbert F. Ross
Attorney, Agent, or Firm—Fulwider, Patton, Rieber, Lee & Utecht

[57] ABSTRACT

A structure is provided which serves as both a fishing creel and a seat. An upright bucket is equipped with a removable padded lid, and a cabinet with drawers extends laterally from either side of the bucket. A fishing pole holder is mounted on the upper surface of the cabinet, and is attached thereto with a screwcap fastening. A fishing pole rack and towel bar are mounted on the side of the cabinet. The bucket is adapted to receive a creel for carrying fish.

5 Claims, 7 Drawing Figures

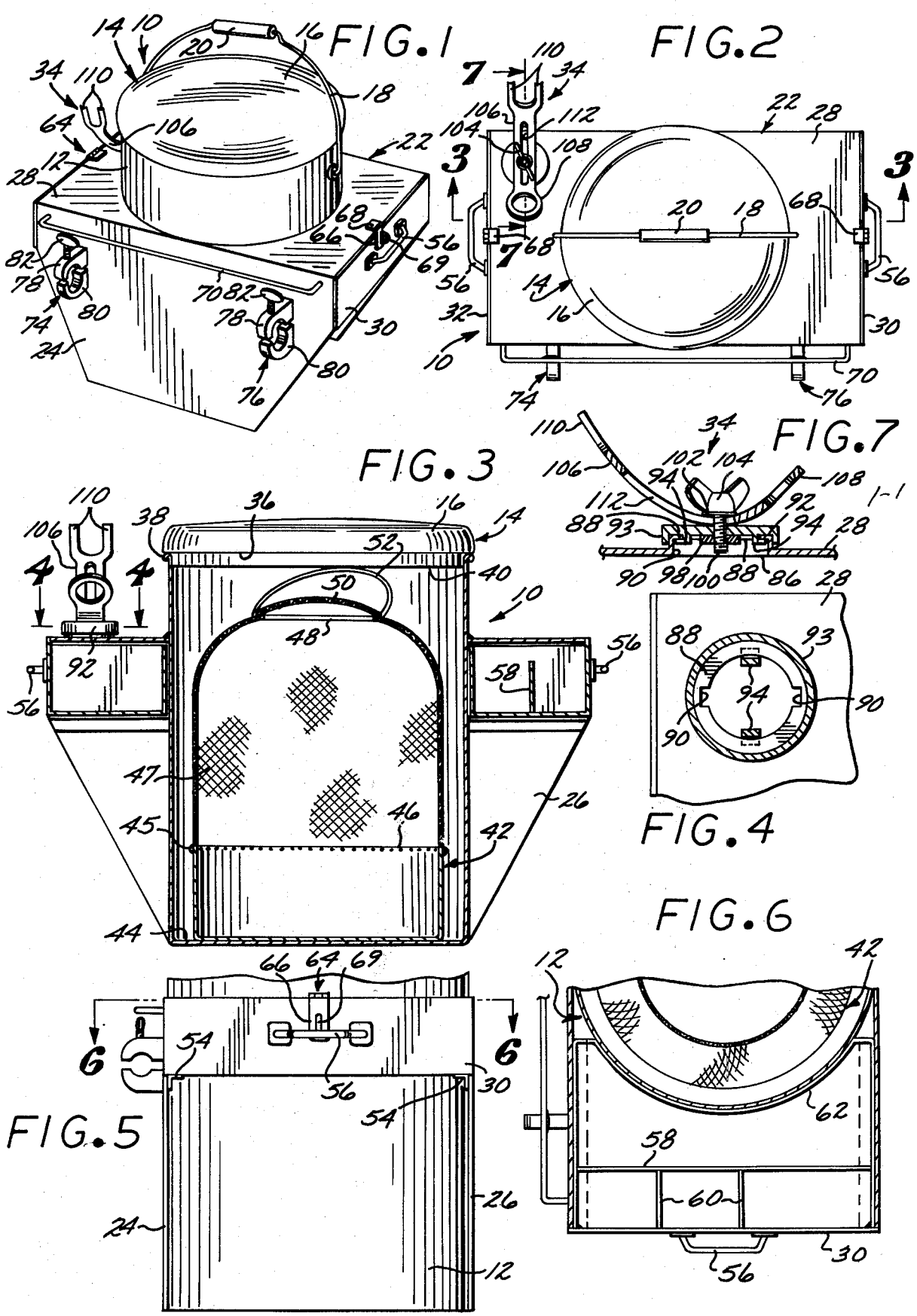

COMBINATION FISHING CREEL AND SEAT

BACKGROUND OF THE INVENTION

1. Field of the Invention

The present invention relates to portable accessories useful for carrying fishing tackle and fish and to otherwise facilitate fishing from shore.

2. Description of the Prior Art

Heretofore, fishermen have suffered a number of discomforts and inconveniences in the pursuit of their hobby. Fishermen typically seat themselves on the rocks, grass or otherwise on objects found in their surroundings at a fishing location. Alternatively, they carry folding chairs, such as beach chairs upon which to seat themselves. In order to carry a reasonably comfortable seat, fishermen must either make several trips on foot from their vehicles or from a prior fishing site to transport all of their fishing tackle, creels, rods and other accessories. If they attempt to carry all of these items at once, the manual transport of the required fishing gear becomes extremely awkward and oftentimes dangerous, especially when the fisherman is travelling along steep slopes and over rocks, boulders and the like. The transportation of all of the necessary articles of fishing accessories, typically requires both hands, and an individual is simply not able to steady himself to prevent stumbles or falls.

SUMMARY OF THE INVENTION

It is an object of the present invention to provide a fisherman with a compact, portable device which can be carried in one hand to a fishing site, and which serves a multiplicity of purposes. The device of the invention includes an upright bucket having a carrying handle and about which a cabinet is fashioned. The upper surface of the cabinet includes a mounting for removably attaching a fishing pole support. Once the fisherman has cast his line into the water, the pole can be inserted into the support and held erect. The fisherman is thereby not forced to continuously hold the pole in his hands. Nevertheless, the pole is positioned adjacent the padded seat of the bucket, so that when there is a strike on the line, the fisherman is able to grab the pole and remove it from the support in an instant.

The cabinet mounted on the outside of the bucket also includes drawers, preferably positioned on opposite sidws of the bucket for balance. The drawers are equipped with handles and the interior ends of the drawers are arcuately configured to seat snugly against the outside of the bucket. Preferably, latches or clasps are provided so that the drawers may be locked shut, if desired.

On either side of the drawers, the cabinet walls extend downward from a flat, horizontal upper surface on either side of the bucket to form stabilizing supports. The walls are preferably not attached to the bucket at their lower extremities so that they may be wedged into the sand, the soil, or crevices in rocks if desired. On one of the cabinet walls a towel bar is mounted so that a towel can be carried thereon. Also, a fishing pole rack is mounted on a side wall of the cabinet so that the fisherman is able to mount and carry his pole horizontally on the device. Preferably, the fishing pole rack and the towel bar are mounted on the same side wall of the cabinet and are directed outwardly from the bucket as it is carried, so as not to interfere with the fisherman's stride in walking.

The bucket itself can be used to transport food and beverages to the fishing site, and is also used as a container for keeping the fish fresh once the fisherman is at the site. The side walls and the cabinet drawers surround the bucket prevent the direct incidence of sunlight upon the bucket, and the padded seat likewise provides thermal insulation for the bucket as well as a comfortable seat for the fisherman. In this way, the bucket is kept cool and the fish therein remain fresh.

A creel is removably positionable in the bucket, and is normally carried therein. The creel is configured to have a solid concave bottom with walls that extend upward a few inches. Wire mesh is attached to the upper rim of the solid bottom to form wire mesh walls that extend upwardly to a closeable wire mesh lid. The creel is normally equipped with a handle so that it can be easily lifted from and inserted into the bucket. When the bucket is at least partially filled with water, the creel can be inserted therein and withdrawn to maintain a minimum amount of water in the solid concave bottom. The fisherman is thereby able to fill the bucket to store fish therein, but can easily remove the creel and empty the bucket when he is ready to leave the fishing site. By returning the creel to the bucket, a certain amount of water is retained to keep the fish alive as long as possible. At the same time, the fisherman is not burdened with the weight of excess water in walking, since the bucket itself can be emptied prior to leaving the fishing site.

The invention may be described with greater clarity and particularly by reference to the accompanying drawings.

DESCRIPTION OF THE DRAWINGS

FIG. 1 is a perspective view of the portable device of the invention.

FIG. 2 is a top plan view of the device of FIG. 1.

FIG. 3 is a sectional elevational view taken along the lines 3—3 of FIG. 2.

FIG. 4 is a sectional plan detail taken along the lines 4—4 of FIG. 3.

FIG. 5 is a partial elevational end view of the device of FIG. 1.

FIG. 6 is a sectional plan view taken along the lines 6—6 of FIG. 5.

FIG. 7 is a sectional elevational detail taken along the lines 7—7 of FIG. 2.

DESCRIPTION OF THE EMBODIMENT

FIG. 1 illustrates a portable fishing seat 10 comprising an upright cylindrical five gallon bucket 12 having a generally flat disk shaped lid 14 with padding on the upper surface thereof. The bucket 12 has an elongated arcuate wire carrying handle 18 with a cylindrical wooden grip 20 at the center thereof and with ends journalled loosely into the outer walls of the bucket 12 diametrically opposite each other. A generally laterally extending cabinet 22 is secured to the outer wall of the bucket by welding or other suitable means of attachment and includes generally trapezoidal sheet metal side walls 24 and 26 which are bent downward from a flat horizontal upper sheet metal surface 28 within which the bucket 12 is centered. The cabinet 22 encloses a pair of tackle drawers 30 and 32 that slide laterally into the cabinet 22 on opposite sides of the bucket 12. A fishing pole support 34 is mounted on the flat upper surface 28, as depicted in FIGS. 2, 3, 4 and 7.

As depicted in FIG. 3, the lid 14 includes a shoulder 36 on its underside which rests upon an upper circular bead 38 of the bucket 12. The lid 14 is centered by a flat positioning disk 40 located just interiorally of the shoulder 36. A thin vinyl sheet forms a cover 16 and is stretched over the padding and secured about the perimeter of the lid 14 at its underside.

Within the bucket 12 a creel 42 rests removably upon the full bucket floor 44, as illustrated in FIG. 3. The creel 42 has a solid, concave pan shaped sheet metal bottom 46 with walls extending upward about three inches. At the rim 45 along the upper edge of the walls of the bottom 46, an enclosing wire mesh 47 of generally elongated configuration is secured. The wire mesh extends upwardly and converges toward a circular creel mouth, indicated at 48. The mouth 48 is defined by a circular wire ring at which the mesh 47 terminates. A flip-top closeable lid 50 is hinged at one side of the mouth 48. The lid 50 is also formed slightly concave downward, and is sized to cover the circular mouth 50. An arcuate wire lifting handle 52 is also attached at diametrically opposite locations along the wire ring 48 to allow the creel 42 to be lifted from the bucket 12. Normally, while at the fishing site the fisherman will typically keep the bucket 12 filled with water. The more water in the bucket 12, the longer fish will stay alive within its confines. Furthermore, the weight of the water in the bucket 12 keeps the portable fishing seat of the invention from tipping over should a large fish strike on a line of a pole positioned in the pole support 34. A certain amount of water will remain in the pan bottom 46 so that fish in the creel 42 will not immediately expire.

The drawer construction within the cabinet 22 is depicted in detail in FIGS. 5 and 6. The drawers 30 and 32 are mounted for horizontal movement along a radial path relative to the center of the bucket 12. The drawers 30 and 32 are shallow and slide atop a pair of horizontally extending angle shaped drawer glides 54, depicted in FIG. 5. The drawers 30 and 32 are drawn by conventional U-shaped handles or pulls 56 bolted or riveted to the drawer faces.

The drawers 30 is compartmentalized, as illustrated in FIG. 6. Interior vertical partitions 58 and 60 divide the drawer into compartments to facilitate organization of fishing tackle carried therein. The drawer 32 is not compartmentalized, so as to more easily accomodate larger articles, such as scaling knives and the like. As is apparent in FIG. 6, the interior end walls 62 of the drawers 30 and 32 are configured arcuately to seat snugly against the cylindrical outside wall of the side of the bucket 12. This maximizes the available storage space in the drawers 30 and 32.

As depicted in FIGS. 1 and 5, the drawers 30 and 32 are equipped with latches 64. The latches each include a leaf 66 hingedly fastened to a base 68 that is mounted atop the flat upper surface 28 of the cabinet 22. Each leaf 66 includes an elongated slot adapted to pass over an outwardly extending eye loop 69 fastened to the front faces of the drawers 30 and 32. If desired, a conventional padlock or combination lock can be used to secure the drawers 30 and 32 shut to secure the contents thereof.

The sides 24 and 26 of the cabinet 22 are flat sheet metal walls that extend downward on either side of the bucket 12 as depicted in FIGS. 1, 2 and 5. A towel 70 is mounted near the upper edge of the side 24 and is constructed as an elongated rod with inwardly turned feet that hold it a short distance away from the side wall 24. A towel can thereby be conveniently hung over the towel bar 70 with one portion tucked into the gap between the towel bar 70 and the side 24, and with the other portion overhanging the towel bar 70 on the outside.

A fishing pole mounting rack is provided and includes a pair of clamps 74 and 76, also fastened to the side 24 of the cabinet 22. Each of the clamps 74 and 76 includes an upper bracket 78 and a lower bracket 80, both of generally semicircular configuration, mounted to define a generally circular opening. Thumbscrews 82 are received in tapped apertures in the upper brackets 78, and can be adjusted to securely lock a fishing pole in position by clamping the pole against the lower brackets 80. This allows the pole to be carried horizontally along the outside of the portable seating device 10 as the fisherman walks.

Preferably either the upper brackets or the lower brackets are formed of resilient material, such as rubber, so that they yield to receive the pole in the gap between upper and lower brackets when the pole is laterally inserted.

The mounting and structure of the pole support 34 is depicted in detail in FIGS. 2, 3, 4 and 7. An upwardly directed circular shoulder 86 protrudes from the upper flat surface 28 of the cabinet 22, as depicted in FIG. 7. The shoulder 86 includes an inwardly directed encircling ledge 88 in which two outwardly directed radial gaps 90 are defined, as illustrated in FIGS. 4 and 7. A screw cap 92 includes an encircling skirt 93 and is open at its underside, but includes outwardly directed tangs 94 located diametrically opposite each other and spaced inwardly from the encircling skirt 93. To fasten the screw cap 92 to the cabinet 22, the tangs 94 are positioned directly above the gaps 90 in the ledge 88. The underside of the ledge 88 is configured in sloped fashion so that clockwise twisting of the screw cap 92 relative to the shoulder 86 carries the tangs into vertical abutment with the underside of the ledge 88, thus tightening the screw cap 92 relative to the upper flat surface 28. As illustrated in FIG. 7, the screw cap 92 includes a central bore. A nut 98 is welded to the underside of the screw cap 92 in axial alignment with the tapped bore. An elongated rod 100 is threadably engageable in the nut 98. The rod 100 includes a retaining washer 102 and a wing nut type head 104. The retaining washer 102 and the wing nut together retain a configured sheet metal strap 106 in position.

The strap 106 is a thin arcuately curved generally fork shaped structure. The strap 106 has a lower end 108 in which a circular lateral restraining loop is defined. The elevated end of the strap 106 is bifurcated to form a yoke with legs 110, as indicated in FIGS. 1–3. The strap 106 includes an intermediate elongated slot, indicated at 112 in FIGS. 2 and 7. The slot terminates short of the loop in the lower end 108 and short of the yoke at the opposite end.

One attitude of relationship of the lower end 108 and the yoke legs 110 of the strap 106 is depicted in FIG. 7. It can be seen that a fishing pole can be positioned with the butt of its handle extending into and laterally entrapped by the loop in the lower end 108 and with the remote end of its handle resting between the legs 110 of the yoke at the opposite end of the strap 106. If it is desired to raise or lower the attitude of the pole, the windg nut head 104 can be turned to lossen the threaded rod 100 from the nut 98 to allow the strap 106 to slide longitudinally relative to the rod 100. The extent to which the strap 106 can be longitudinally adjusted is governed by the overall length of the elongated slot 112. Once the fisherman is satisfied with the attitude of the pole by adjusting the strap 106 relative to the threaded rod 100, he tightens the wing nut head 104 so that the retaining washer 102 bears downwardly and locks the strap 106 in a particular attitude as desired. The fishing pole can then be made to extend outward over the water at a low angle, or to extend sharply upward, as desired by the fisherman.

It can be seen that the fishing pole seating device 10 of the invention is extremely handy and performs a multitude of functions. In proceeding upon a fishing expedition, the fisherman typically places his lunch and any desired beverages in the bucket 12 and places the lid 14 in position after insuring that he has the necessary fishing tackle which he desires in the drawers 30 and 32. He secures his fishing pole in position in the rack formed by the clamps 74 and 76 by inserting it laterally into the gaps between the upper bracket 78 and lower brackets 80.

The thumbscrews 82 are then tightened lightly to insure that the pole remains snugly into position. The fisherman then positions a towel on the towel rack 70 and will typically unscrew the screw cap 92 and temporarily store it in the tackle drawer 32. This prevents the pole support from snagging in his clothing as he walks.

The fisherman then proceeds to the fishing site. Normally, in walking to the site he will carry the portable fishing seat by the grip 20 with the towel bar 70 and the pole clamps 74 and 76 on the side of the portable seat 10 opposite that which is allowed to brush in contact with his legs as he walks.

Upon reaching the fishing site, the fisherman removes the lid 14 and fills the bucket 12 with water. He inserts the pole support 34 by pressing the screw cap 92 downward against the shoulder 86 with the tangs 94 in alignment with the apertures 90 in the ledge 88. He then twists the cap 92 clockwise to secure it atop the flat upper surface 28 of the cabinet 22. He then loosens the wing nut head 104 of the rod 100 and adjusts the attitude of the elongated strap 106 of the pole support 34 so that the slot 112 is in appropriate registration with the threaded rod 100, as indicated in FIG. 7. He then turns the wing nut head 104 to lock the strap 106 in position and proceeds to fish seated upon the cushioned upper surface of the lid 14. Since the water in the bucket 12 will prevent the portable fishing pole seat 10 from tipping over should he leave the seated position, the fisherman can move about freely in the area.

As fish are caught, the fisherman removes the lid 14 of the bucket 12 and lifts up the lid 50 of the creel 42 and drops the fish into the creel 42. The towel on the towel bar 70 is available to wipe his hands. He then replaces the lid 14. The fish remain cool within the confines of the bucket 12 since the padding on the lid 14 and the expansive flat upper surface 28 limit thermal solar energy transmitted to the interior of the bucket 12.

When the fisherman is ready to leave the fishing site, he removes the lid 14. With the lid 14 of the bucket 12 removed, the fisherman can grasp the creel 42 by the lifting handle 52 and raise the creel 42 out of the bucket 12. To the extent that the water level is above the upper rim 45 of the buttom pan 46 of the creel 42, water will flow through the interstices in the mesh 47 into the bucket 12. A minimum level of water will remain in the creel 42, however, since the walls of the bottom pan 46 extend upward several inches. With the water in the pan bottom 46 of the creel 42, the fish in the creel do not expire immediately. The fisherman then tips the portable fishing seat 10 on its side to empty the remaining water from the bucket 12. He replaces the creel 42 in the bucket 12 and repositions the lid 14 atop the bead 38 of the bucket 12. The fisherman is thereby able to carry the device 10 by the wire handle 18 using the grip 20, but he is not burdened with excess water in the bucket 12.

He then removes the pole support 34 and places it again in the drawer 32. He is then ready to leave the fishing site, carrying the portable seat 10 in the same fashion as when he arrived with it.

It can be seen that the invention can be modified and altered in various ways without departing from the fundamental concepts thereof. Accordingly, the scope of the application should not be construed as limited to the specific embodiment depicted in the drawings, but rather is defined in the claims appended hereto.

I claim:

1. A portable fishing seat combination comprising an upright cylindrical bucket having a removable padded lid which includes a flat positioning disk located on its underside and which rests upon the mouth of the bucket, a cabinet affixed externally to said bucket at a location below said lid and extending laterally therefrom and having side walls and a flat upper surface with a screw cap mounting thereon for supporting a fishing pole thereon, and said side walls extend downwardly from said flat upper surface on opposite sides of said bucket to the level of the bottom of said bucket, and said cabinet encloses a pair of diametrically opposed laterally reciprocal tackle drawers mounted in said cabinet and externally of said upright bucket, and the inner ends of said drawers are configured to the contour of the sides of said bucket and seat snugly thereagainst, a carrying handle fastened to the sides of said bucket between said padded lid and said cabinet, a towel bar mounted horizontally on one of said side walls of said cabinet and a fishing pole rack mounted on the same side wall of said cabinet below said towel bar for carrying a fishing pole horizontally, a pole support having means for holding a fishing rod in inclined disposition affixed atop said flat upper surface and is removably engageable in said screw cap mounting on said flat upper cabinet surface, said pole support having means for slidingly adjusting the degree of inclination of said fishing pole, and a creel removably positionable in said bucket with said padded lid in position on said bucket, said creel having a solid, cylindrical concave bottom pan portion and open wire mesh walls extending upwardly from said pan and includes a closable lid, whereby said bottom pan retains a minimum water level in said creel and said wire mesh walls and said closeable creel lid provide a restraining enclosure for solid objects in said creel while allowing water to flow out of said creel down to said minimum water level of said concave bottom pan.

2. A fishing seat according to claim 1 further characterized in that said pole support is comprised of a metal strap having a lower end with a lateral restraining loop therein, an elevated end with a yoke, and means for attaching said strap to said mounting.

3. A fishing seat according to claim 2 further characterized in that said means for attaching said strap to said mounting is comprised of a threaded rod with a retaining head, and said mounting means is tapped to receive said rod in threaded engagement therewith.

4. A fishing pole seat according to claim 3 further characterized in that said strap is formed with an elongated slot defined therein, whereby said strap can be moved longitudinally relative to said threaded rod and releasably secured to said mounting means with the ends of the strap at various attitudes relative to each other.

5. A fishing seat according to claim 1 further characterized in that said cabinet is provided with latches, whereby said drawers may be locked shut.

* * * * *